United States Patent
Sul (10) Patent No.: US 12,273,414 B2
(45) Date of Patent: Apr. 8, 2025

(54) HIGH-SPEED SYNCHRONIZATION APPARATUS AND METHOD BASED ON BLOCKCHAIN UNIT FILE

(71) Applicant: ELECTRONICS AND TELECOMMUNICATIONS RESEARCH INSTITUTE, Daejeon (KR)

(72) Inventor: Dong-Myung Sul, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 172 days.

(21) Appl. No.: 18/332,393

(22) Filed: Jun. 9, 2023

(65) Prior Publication Data

US 2024/0146802 A1 May 2, 2024

(30) Foreign Application Priority Data

Oct. 27, 2022 (KR) .......................... 10-2022-0140548

(51) Int. Cl.
 *H04L 67/1074* (2022.01)
 *G06F 9/46* (2006.01)
 (Continued)

(52) U.S. Cl.
 CPC .......... *H04L 67/1078* (2013.01); *G06F 9/463* (2013.01); *H04L 67/1095* (2013.01); *H04L 67/1097* (2013.01)

(58) Field of Classification Search
 None
 See application file for complete search history.

(56) References Cited

U.S. PATENT DOCUMENTS 11,394,584 B2   7/2022   Wang et al.
11,507,562 B1 * 11/2022   Luedtke .................... H04L 9/50
(Continued)

FOREIGN PATENT DOCUMENTS

KR   20150101244 A   9/2015
KR   20210042161 A   4/2021
(Continued)

OTHER PUBLICATIONS

Elli Androulaki et al., "Hyperledger Fabric: a Distributed Operating System for Permissioned Blockchains", EuroSys '18: Proceedings of the Thirteenth EuroSys Conference, pp. 1-15, Apr. 23, 2018.
(Continued)

*Primary Examiner* — Adam Lee
(74) *Attorney, Agent, or Firm* — Rabin & Berdo, P.C.

(57) ABSTRACT

Disclosed herein are a high-speed synchronization apparatus and method based on a blockchain unit file. The high-speed synchronization apparatus includes memory configured to store at least one program, a database including unit files having a uniform size in which blocks are to be sequentially stored, and a processor configured to execute the program, wherein the program is configured to perform comparing a size of a block owned by a relevant peer node with a size of a block in use in a blockchain framework, wherein the size of the block owned by the relevant peer node is represented by a peer block size and the size of the block in use is represented by a channel block size, and when the peer block size is less than the channel block size, acquiring blocks from a peer node that owns a block having the channel block size and synchronizing the blocks.

20 Claims, 7 Drawing Sheets

(51) Int. Cl.
*H04L 67/1095* (2022.01)
*H04L 67/1097* (2022.01)

(56) References Cited

U.S. PATENT DOCUMENTS

| | | | |
|---|---|---|---|
| 11,704,219 B1* | 7/2023 | Lerner | G06F 11/327 |
| | | | 714/57 |
| 11,860,858 B1* | 1/2024 | McKervey | H04L 9/3297 |
| 2015/0242437 A1 | 8/2015 | Lee et al. | |
| 2021/0141804 A1 | 5/2021 | Liu | |
| 2021/0152471 A1* | 5/2021 | Lee | H04L 67/1093 |
| 2022/0253458 A1* | 8/2022 | Shao | G06F 16/2358 |
| 2024/0396754 A1* | 11/2024 | Wright | H04L 9/50 |

FOREIGN PATENT DOCUMENTS

| | | |
|---|---|---|
| KR | 10-2021-0087721 A | 7/2021 |
| KR | 10-2021-0100865 A | 8/2021 |
| KR | 10-2283744 B1 | 8/2021 |
| KR | 10-2425058 B1 | 7/2022 |
| KR | 20220142864 A | 10/2022 |

OTHER PUBLICATIONS

FYIcenter, "Blockfiles of Blockchain," http://www.dev.fyicenter.com/1001287_blockfile_000000-Blockfiles_of_Blockchain.html, (Feb. 7, 2020).

\* cited by examiner

HIGH-SPEED SYNCHRONIZATION APPARATUS AND METHOD BASED ON BLOCKCHAIN UNIT FILE

CROSS REFERENCE TO RELATED APPLICATION

This application claims the benefit of Korean Patent Application No. 10-2022-0140548, field Oct. 27, 2022, which is hereby incorporated by reference in its entirety into this application.

BACKGROUND OF THE INVENTION

Technical Field

The following embodiments relate to synchronization technology for synchronizing the ledger states of a blockchain framework in operation and a new node or a temporarily suspended node when the new node or the temporarily suspended node participates in the blockchain framework in operation in the Hyperledger fabric blockchain framework.

Description of the Related Art

Ethereum and Bitcoin well known to the public may be public blockchains. Anyone may freely participate in such a public blockchain to create blocks without limitation, and may become a node and create transactions.

However, an enterprise or an association such as the financial world needs to access only authorized institutions so as to maintain confidentiality. A private blockchain has been naturally created to meet such a need, and association of enterprises for developing the private blockchain may be the Hyperledger fabric. The Hyperledger fabric allows only specific persons to privately access the corresponding network and enables the configuration of a high-speed network, faster than typical public blockchains to be implemented, instead of paying coins as a compensation means. Further, even though the Hyperledger platform is applied to enterprises, the Hyperledger platform may be combined with the public blockchains, and may then be used to be compatible with the public blockchains.

The Hyperledger fabric, which is a blockchain framework, is a project hosted in a Linux environment, and supports confidentiality and scalability of a business environment using open sources. Further, the Hyperledger fabric hosts smart contracts called "chain code" that forms the application logic of the system by exploiting container technology.

The Hyperledger fabric is an initial distributed ledger platform which supports smart contacts created in a general programming language such as Java, Go or node.js. Furthermore, a consensus protocol may be utilized without cryptocurrency.

The Hyperledger fabric is focused on distributed ledgers, smart contracts, consensus, confidentiality, resiliency, scalability, etc.

The shared ledger of the Hyperledger fabric is composed of two components. One is the world state that is the database of the ledger, which stores the state of the ledger at a specific time point, and the other is transaction data (log) that records all transactions which have resulted in the current value of the world state and that is the update history for the world state.

Therefore, the ledger is a combination of the world state database and the transaction log history. The ledger has a replaceable data storage for the world state, so that the transaction log does not need to be pluggable, and the ledger simply records the before and after values of the ledger database being used by the blockchain network. In the Hyperledger fabric, a node is designated and used as a peer node, and the record unit of the ledger is designated and used as a block.

SUMMARY OF THE INVENTION

An embodiment is intended to reduce a time delay occurring in a synchronization process of matching the ledger state of a current blockchain framework with the ledger state of a participant node when a new node or a temporarily suspended node participates in the blockchain framework in operation in the Hyperledger fabric blockchain framework.

In accordance with an aspect, there is provided a high-speed synchronization apparatus based on a blockchain unit file, including memory configured to store at least one program, a database including unit files having a uniform size in which blocks are to be sequentially stored, and a processor configured to execute the program, wherein the program is configured to perform comparing a size of a block owned by a relevant peer node with a size of a block in use in a blockchain framework, wherein the size of the block owned by the relevant peer node is represented by a peer block size and the size of the block in use is represented by a channel block size, and when the peer block size is less than the channel block size, acquiring blocks from a peer node that owns a block having the channel block size and synchronizing the blocks, wherein the synchronizing includes storing blocks simultaneously acquired from different peer nodes in parallel for respective unit files.

The program may be configured to perform creating multiple threads and performing the comparing and the synchronizing in each of the multiple threads.

The program may be configured to perform, in the synchronizing, selecting the peer node that owns the block having the channel block size, and acquiring and storing blocks, stored in one unit file, from the selected peer node.

The program may be configured to perform, in the selecting, generating a list of all peer nodes that own the block having the channel block size, and selecting an unused peer node that is not used in the synchronizing from among the peer nodes included in the list.

The program may be configured to perform, when there is no unused peer node, selecting again an unused peer node after a certain period of time has elapsed.

The program may be configured to perform, in the storing, requesting blocks corresponding to a size, obtained by adding a certain size to the peer block size, from the selected peer node, receiving a file index number and a last block number, together with requested blocks, from the selected peer node, and storing the received blocks in a unit file corresponding to the received file index number, wherein a process from the requesting to the storing is repeatedly performed until the peer block size updated with storage of the blocks becomes equal to or greater than the last block number.

The program may be configured to perform, in the requesting, setting a state of the peer node to an in use state, and when the peer block size updated with storage of the blocks becomes equal to or greater than the last block number, switching the state of the peer node to an unused state.

The program may be configured to perform, after updating the peer block size to a size greater than the last block number at a time point at which requested blocks are initially received from the selected peer node, re-performing a process from the comparing.

In accordance with another aspect, there is provided a high-speed synchronization apparatus based on a blockchain unit file, including memory configured to store at least one program, a database including unit files having a uniform size in which blocks are to be sequentially stored, and a processor configured to execute the program, wherein the program is configured to perform receiving a request to deliver blocks corresponding to a size, obtained by adding a certain size to a peer block size from a participating peer node that newly accesses or re-accesses a blockchain framework, and creating the requested blocks in a form of blocks having the certain size and transmitting the created blocks to the participating peer node.

The program may be configured to perform in the transmitting, opening a unit file in which the blocks corresponding to the size, obtained by adding the certain size to the peer block size, are stored, and thereafter creating the blocking having the certain size, and transmitting a file index number and a last block number, together the created blocks having the certain size, to the participating peer node.

The program may be configured to perform providing against next consecutive requests by creating next blocks having the certain size in preparation for next consequent requests from the participating peer node.

The program may be configured to perform, in the transmitting, when there are requested blocks having the certain size, transmitting prepared blocks having the certain size.

In accordance with a further aspect, there is provided a high-speed synchronization method based on a blockchain unit file, the high-speed synchronization method being performed in a participating peer node that newly accesses or re-accesses a blockchain framework composed of peer nodes, each including a database including unit files having a uniform size, in which blocks are to be sequentially stored, the high-speed synchronization method including comparing a size of a block owned by a relevant peer node with a size of a block in use in a blockchain framework, wherein the size of the block owned by the relevant peer node is represented by a peer block size and the size of the block in use is represented by a channel block size, and when the peer block size is less than the channel block size, acquiring blocks from a peer node that owns a block having the channel block size and synchronizing the blocks, wherein the synchronizing includes storing blocks simultaneously acquired from different peer nodes in parallel for respective unit files.

The high-speed synchronization method may further include creating multiple threads, wherein the comparing and the synchronizing are performed in each of the multiple threads.

The synchronizing may include selecting the peer node that owns the block having the channel block size, and acquiring and storing blocks, stored in one unit file, from the selected peer node.

The selecting may include generating a list of all peer nodes that own the block having the channel block size, and selecting an unused peer node that is not used in the synchronizing from among the peer nodes included in the list.

The high-speed synchronization method may further include, when there is no unused peer node, selecting again an unused peer node after a certain period of time has elapsed.

The storing may include requesting blocks corresponding to a size, obtained by adding a certain size to the peer block size, from the selected peer node, receiving a file index number and a last block number, together with requested blocks, from the selected peer node, and storing the received blocks in a unit file corresponding to the received file index number, wherein a process from the requesting to the storing is repeatedly performed until the peer block size updated with storage of the blocks becomes equal to or greater than the last block number.

The requesting may include setting a state of the peer node to an in-use state, and when the peer block size updated with storage of the blocks becomes equal to or greater than the last block number, switching the state of the peer node to an unused state.

The high-speed synchronization method may further include, after updating the peer block size to a size greater than the last block number at a time point at which requested blocks are initially received from the selected peer node, re-performing a process from the comparing.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms.

These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, a high-speed synchronization apparatus and method based on a blockchain unit file according to embodiments will be described in detail with reference to FIGS. 1 to 8.

Figure 1:
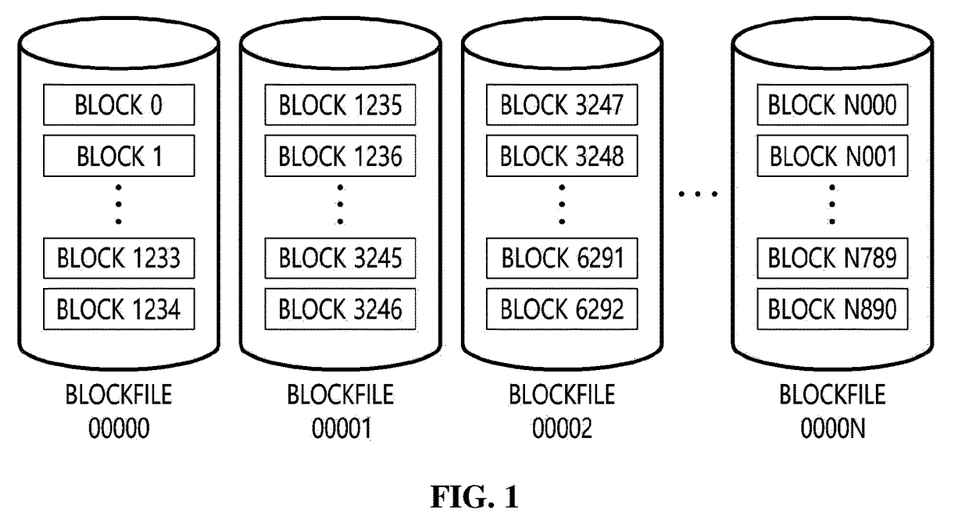
FIG. 1 is a diagram illustrating an example of the configuration of a block file database (DB) of the Hyperledger fabric.

FIG. 1 is a diagram illustrating an example of the configuration of a block file database (DB) of the Hyperledger fabric.

Referring to FIG. 1, blocks may be stored and managed in unit files having a uniform size in a Hyperledger fabric blockchain.

The blocks are sequentially stored in the unit files such that, when the sizes of blocks to be stored are greater than the size of one unit file, the blocks are consecutively stored in a newly created unit file.

However, the sizes of the blocks are determined when the blocks are created, and may not be uniform. Therefore, the numbers of blocks stored in respective unit files having a uniform size may not be uniform.

Meanwhile, file names may be assigned in the order of creation of the unit files so as to identify the unit files. For example, as illustrated in FIG. 1, file000000, file000001, file000002, . . . , file00000n may be assigned to the unit files in the order of creation of the unit files. Further, the corresponding order information may be used in a block index.

Such a block index may be used to search the block file DB of the Hyperledger fabric for specific block data. Such a block index may include information such as the order number of each file having the corresponding block, the start address of the corresponding block in the file, and the block size.

Figure 2:
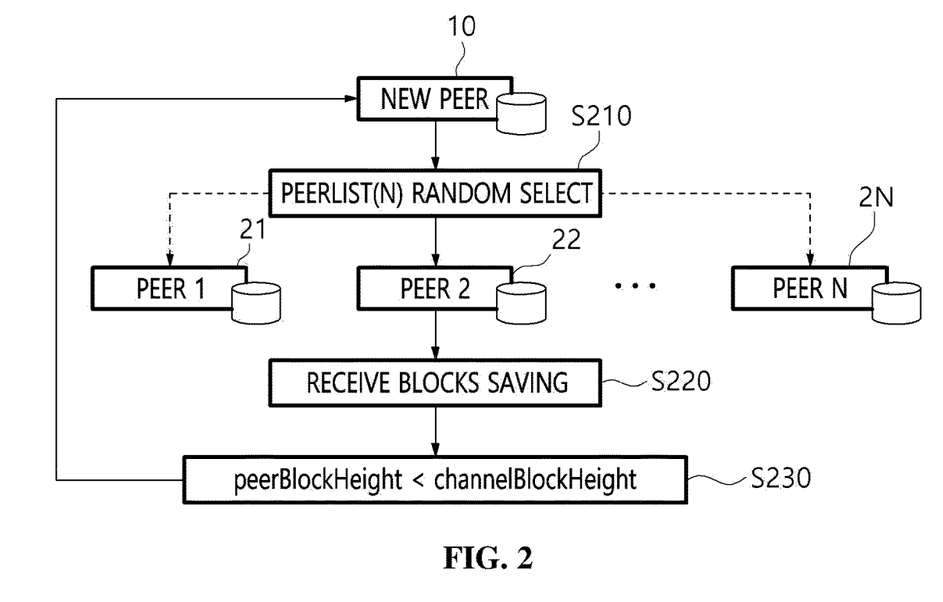
FIG. 2 is a flowchart for explaining a synchronization process in a typical Hyperledger fabric blockchain.

FIG. 2 is a flowchart for explaining a synchronization process in a typical Hyperledger fabric blockchain.

Referring to FIG. 2, a peer node (new peer) 10 which participates in a blockchain framework in operation so as to newly access or re-access the blockchain framework in operation may perform a synchronization process to match the state of a block recorded in a database (DB) owned by the peer node with that of the blockchain framework.

That is, the peer node 10 may randomly select one peer node from among existing peer nodes 21, 22, . . . , 2N at step S210.

In this case, when there is the difference between the size of the block (peerBlockHeight) owned by the peer node 10 and the size of a block (channelBlockHeight) currently used in the blockchain framework, one of the existing peer nodes that own a block having a size of channelBlockHeight may be randomly selected.

Thereafter, the peer node 10 may request blocks having a certain size unit (batchSize=10), which are not owned thereby, from the selected peer node, may acquire the blocks from the selected peer node, and may store the acquired blocks at step S220.

Next, the peer node 10 may again check the difference between peerBlockHeight and channelBlockHeight at step S230, and may repeatedly perform steps S210 and S220 until the difference between peerBlockHeight and channelBlockHeight disappears.

Figure 3:
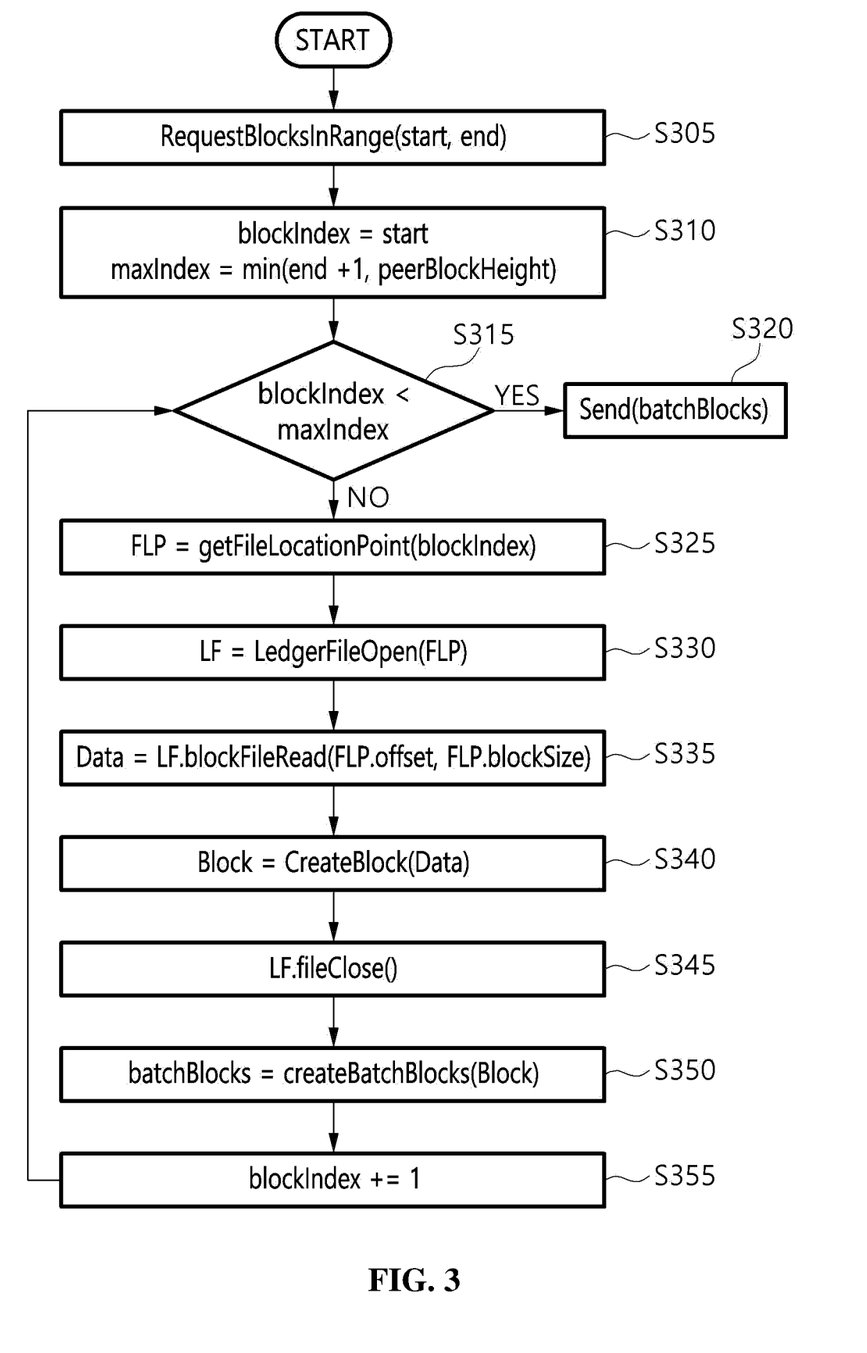
FIG. 3 is a flowchart for explaining a synchronization process in the existing peer node of the typical Hyperledger fabric.

FIG. 3 is a flowchart for explaining a synchronization process in the existing peer node of the typical Hyperledger fabric.

Referring to FIG. 3, when the existing peer node receives requests for blocks having a certain size step S305, the existing peer node sets a smaller value between a requested maximum size and the maximum size of blocks owned by the peer node to the maximum size of the block to be sent at step S310.

Thereafter, the existing peer node gets information about the corresponding block (e.g., the serial number of a file database, the start address of the corresponding block in a file, the size of the block, etc.), starting from a requested starting block, from a block index at step S325. Thereafter, a file having the corresponding block is opened at step S330, and data corresponding to the size of the corresponding block is read from the storage location of the block at step S335, whereby one block is created at step S340 and is added to the block list to be sent, and the opened file is closed at step S345.

The existing peer node compares the size of the created block with the maximum value of the requested block at step S315, and repeatedly performs steps S325 to S355 when the size of the created block is less than the maximum value.

Meanwhile, when the size of the created block reaches the maximum value, the existing peer node delivers the blocks created up to the current time to the peer node that has requested the corresponding blocks at step S320.

When a random peer node is selected each time at step S210 illustrated in FIG. 2, the corresponding peer node performs a process of opening the file in which the blocks are stored, as illustrated in FIG. 3, reading data from a required portion, and thereafter creating blocks to be delivered. However, due to the process illustrated in FIG. 3, a considerable delay occurs in synchronization.

That is, because the synchronization time is required in proportion to the difference between peerBlockHeight and channelBlockHeight, a delay may occur when a new peer node performs a normal role.

Therefore, the present disclosure is intended to request and acquire, in parallel, blocks from multiple peer nodes for each individual file by utilizing characteristics that the Hyperledger fabric manages the same blocks in a unit file for each peer node, thus minimizing a synchronization time. That is, the described embodiment conforms to a parallel processing scheme by simultaneously requesting and receiving blocks from multiple peer nodes that own required blocks rather than requesting blocks from one peer node.

Figure 4:
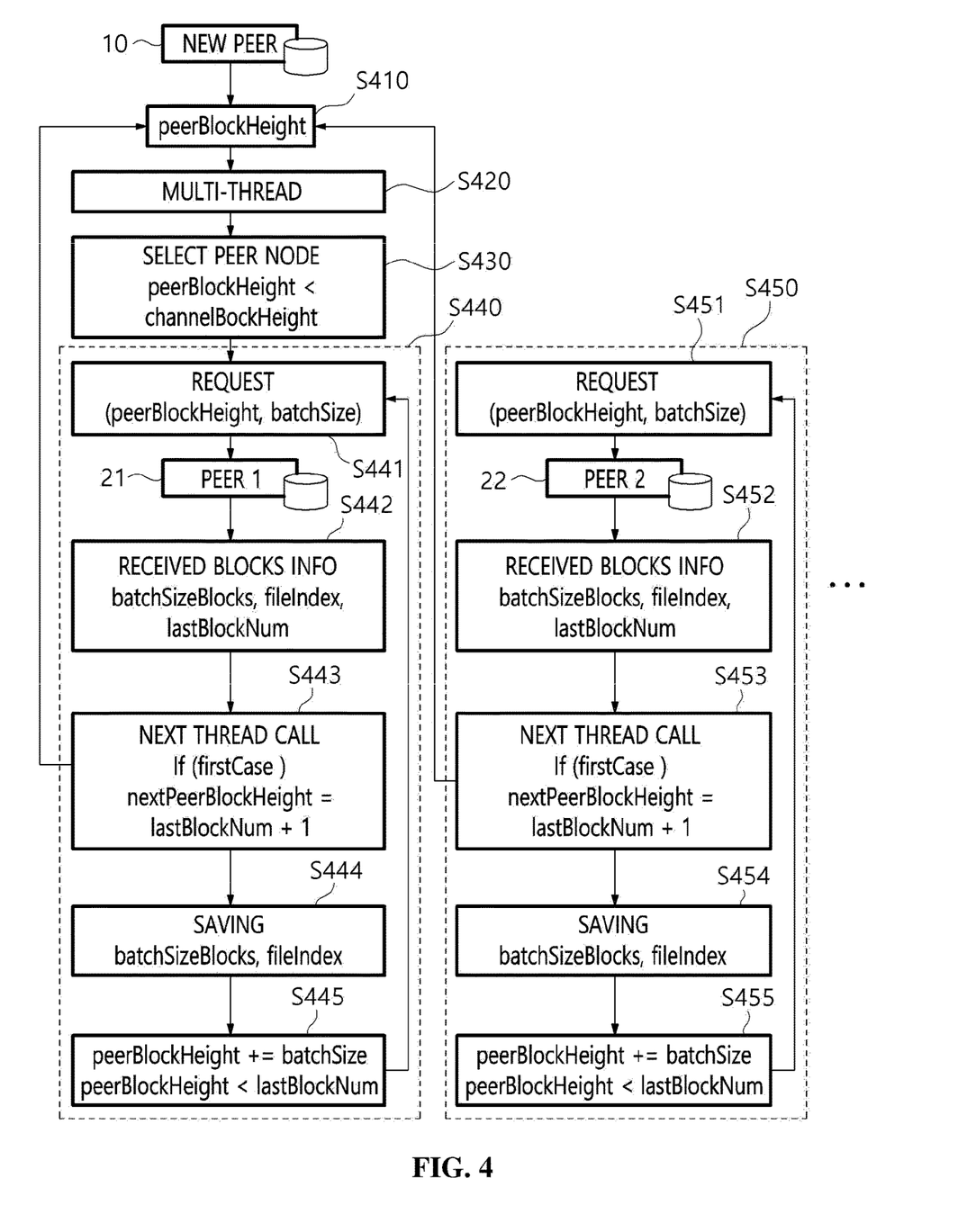
FIG. 4 is a signal flowchart for explaining a high-speed synchronization method based on a blockchain unit file according to an embodiment.

FIG. 4 is a signal flowchart for explaining a high-speed synchronization method based on a blockchain unit file according to an embodiment.

Referring to FIG. 4, in the high-speed synchronization method based on a blockchain unit file according to the embodiment, a participating peer node 10 which newly accesses or re-accesses the Hyperledger fabric may perform step S430 of comparing the size of a block owned by the participating peer node 10 (hereinafter referred to as a 'peer block size (peerBlockHeight)') with the size of a block being used by the blockchain framework (hereinafter referred to as a 'channel block size (channelBlockHeight)'), and steps S440 and S450 of, when the peer block size (peerBlockHeight) is less than the channel block size (channelBlockHeight), acquiring blocks from peer nodes 21, 22, . . . , that own the blocks having the channel block size (channelBlockHeight), and synchronizing the blocks.

In this case, each of the participating peer node 10 and the multiple peer nodes 21, 22, . . . , may include a database (DB) composed of unit files having a uniform size, in which blocks are to be sequentially stored.

Therefore, as illustrated in FIG. 4, the participating peer node 10 may simultaneously request blocks for each unit file from the multiple peer nodes 21, 22, . . . , in a distributed manner, and may synchronize the blocks in parallel.

For this, the participating peer node 10 may create multiple threads to be processed in parallel at step S420. At this time, the creation of the threads may be performed at time points (at steps S442 and S452) at which block information is initially received from the peer nodes 21, 22, . . . , which are selected by the participating peer node 10 in a previous thread. Here, the last block number of the unit file that is currently being processed is received, and parallel requests may be provided to additional peer nodes using the last block number.

For example, the participating peer node 10 may request creation of a second thread at step S443 immediately after the participating peer node 10 initially receives block information from the peer node 21 in a first thread at step S442. Then, the participating peer node 10 may perform steps S430 and S450 in the second thread while sequentially performing steps S444, S445, and S441 in the first thread.

Then, the operations of the participating peer node 10 and the peer nodes 21, 22, . . . , will be described in detail below with reference to FIGS. 5 to 7.

Figure 5:
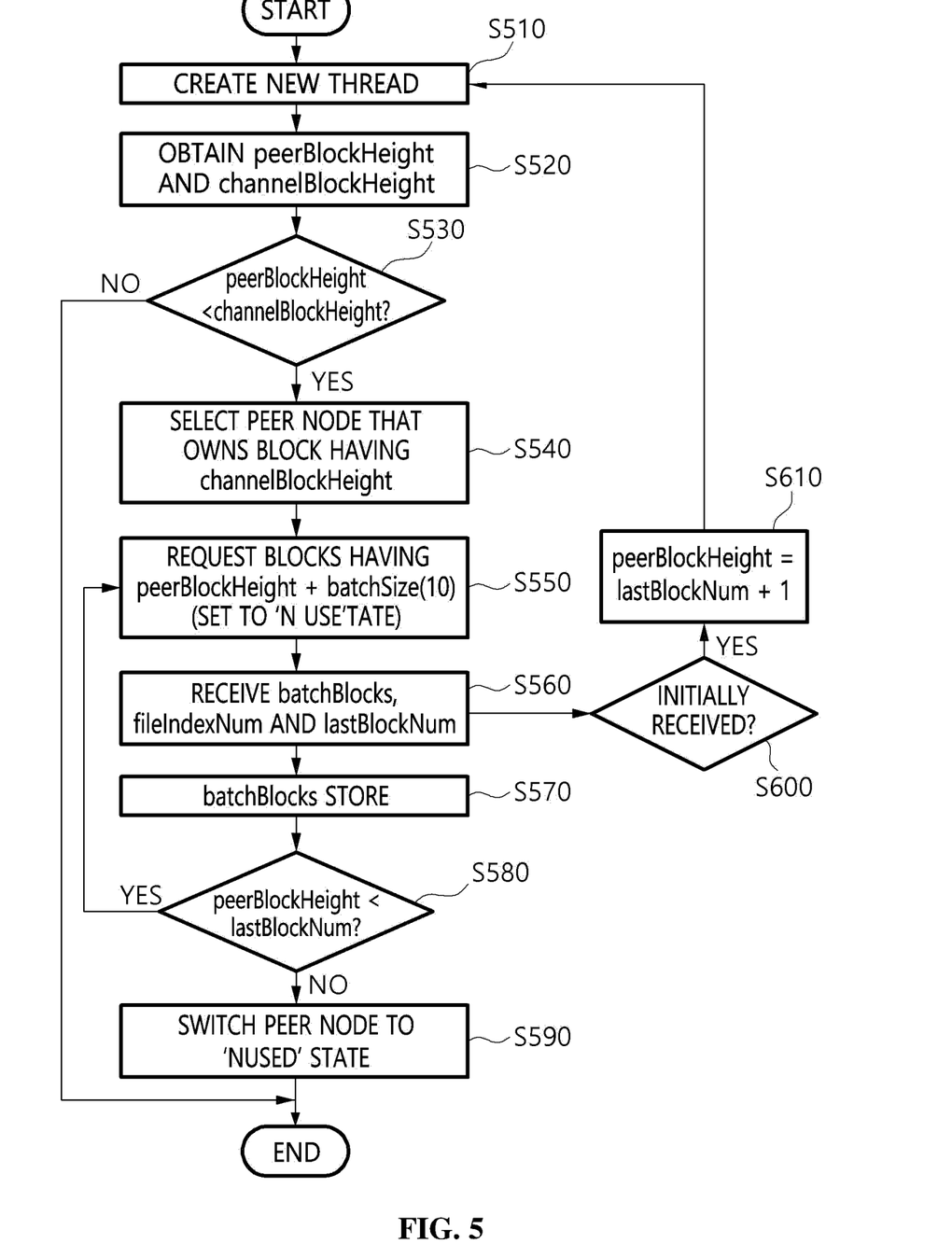
FIGS. 5 and 6 are flowcharts for explaining a high-speed synchronization method based on a blockchain unit file in a participating peer node that newly accesses or re-accesses a blockchain framework according to an embodiment.
Figure 6:
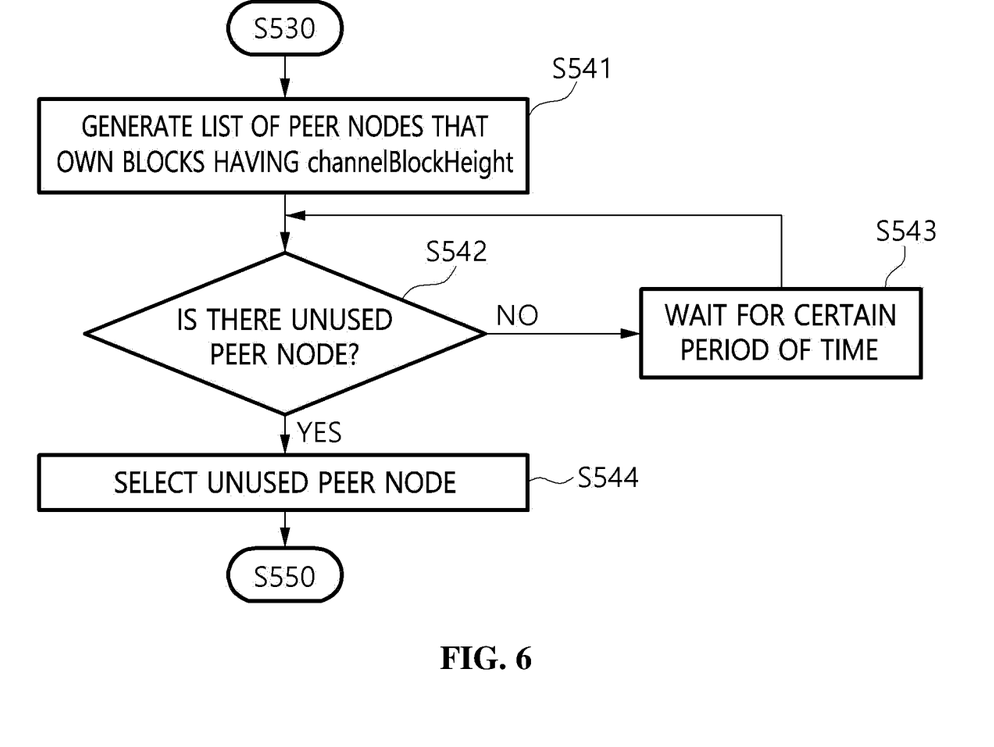

FIGS. 5 and 6 are flowcharts for explaining a high-speed synchronization method based on a blockchain unit file in a participating peer node that newly accesses or re-accesses a blockchain framework according to an embodiment.

Referring to FIG. 5, the participating peer node 10 creates a new thread so as to newly access or re-access a blockchain framework at step S510.

Next, the participating peer node 10 obtains a peer block size (peerBlockHeight) and a channel block size (channelBlockHeight) at step S520, and determines whether the peer block size (peerBlockHeight) is less than the channel block size (channelBlockHeight) at step S530.

When it is determined at step S530 that the peer block size (peerBlockHeight) is less than the channel block size (channelBlockHeight), the participating peer node 10 selects a peer node that owns a block having the channel block size (channelBlockHeight) at step S540.

In detail, referring to FIG. 6, the participating peer node 10 may generate a list of all peer nodes that own the block having the channel block size (channelBlockHeight) at step S541, and thereafter select an unused peer node, which is not used at the synchronization step, from among peer nodes included in the list, at step S544.

Here, when there is no unused peer node at step S542, an unused peer node may be selected again after a certain period of time has elapsed at step S543.

Thereafter, referring back to FIG. 5, the participating peer node 10 may perform steps S550 to S580 of acquiring blocks, stored in one unit file, from the selected peer node and storing the blocks.

In detail, the participating peer node 10 requests blocks corresponding to the size, obtained by adding a certain size (i.e., batchSize: 10) to the peer block size (peerBlockHeight), from the selected peer node at step S550.

Here, the participating peer node 10 may set the state of the peer node to 'in use'. The reason for this is that the selected peer node is to be prevented from being selected in a next thread.

Thereafter, the participating peer node 10 receives file database information including a file index number (fileIndexNum) and a last block number (lastBlockNum), together with the requested blocks having a uniform size (batchBlocks), from the selected peer node at step S560.

Then, the participating peer node 10 stores the received blocks (batch blocks) in a unit file corresponding to the received file index number (fileIndexNum) at step S570. Here, the peer block size (peerBlockHeight) may be undated, as shown in the following Equation (1):

$$peerBlockHeight = peerBlockHeight + batchSize \qquad (1)$$

Here, steps S550 to S570 may be repeatedly performed until the peer block size (peerBlockHeight) updated with the storage of blocks is equal to or greater than the last block number (lastBlockNum).

That is, the participating peer node 10 may determine whether the peer block size (peerBlockHeight) updated with the storage of blocks is less than the last block number (lastBlockNum) at step S580.

When it is determined at step S580 that the peer block size (peerBlockHeight) updated with the storage of blocks is less than the last block number (lastBlockNum), the participating peer node 10 proceeds to step S550.

On the other hand, when it is determined at step S580 the peer block size (peerBlockHeight) updated with the storage of blocks is not less than the last block number (lastBlockNum), the participating peer node 10 may switch the state of the peer node to "unused", thus allowing the peer node to be used in another thread.

Meanwhile, at steps S540 to S590 of performing synchronization according to the embodiment, blocks simultaneously acquired from different peer nodes in parallel for respective unit files may be stored.

These steps may be performed by threads created for respective unit files. That is, when the requested blocks are initially received from the selected peer node at step S600, the participating peer node 10 updates the peer block size (peerBlockHeight), as represented by the following Equation (2) at step S610.

$$peerBlockHeight = lastBlockNum + 1 \qquad (2)$$

Thereafter, the participating peer node 10 returns to step S510 where a new thread is created again, after which subsequent steps may be performed.

Here, when it is determined at step S530 that the peer block size (peerBlockHeight) is not less than the channel block size (channelBlockHeight), the participating peer node 10 determines that synchronization is completed, thus terminating the synchronization process.

Figure 7:
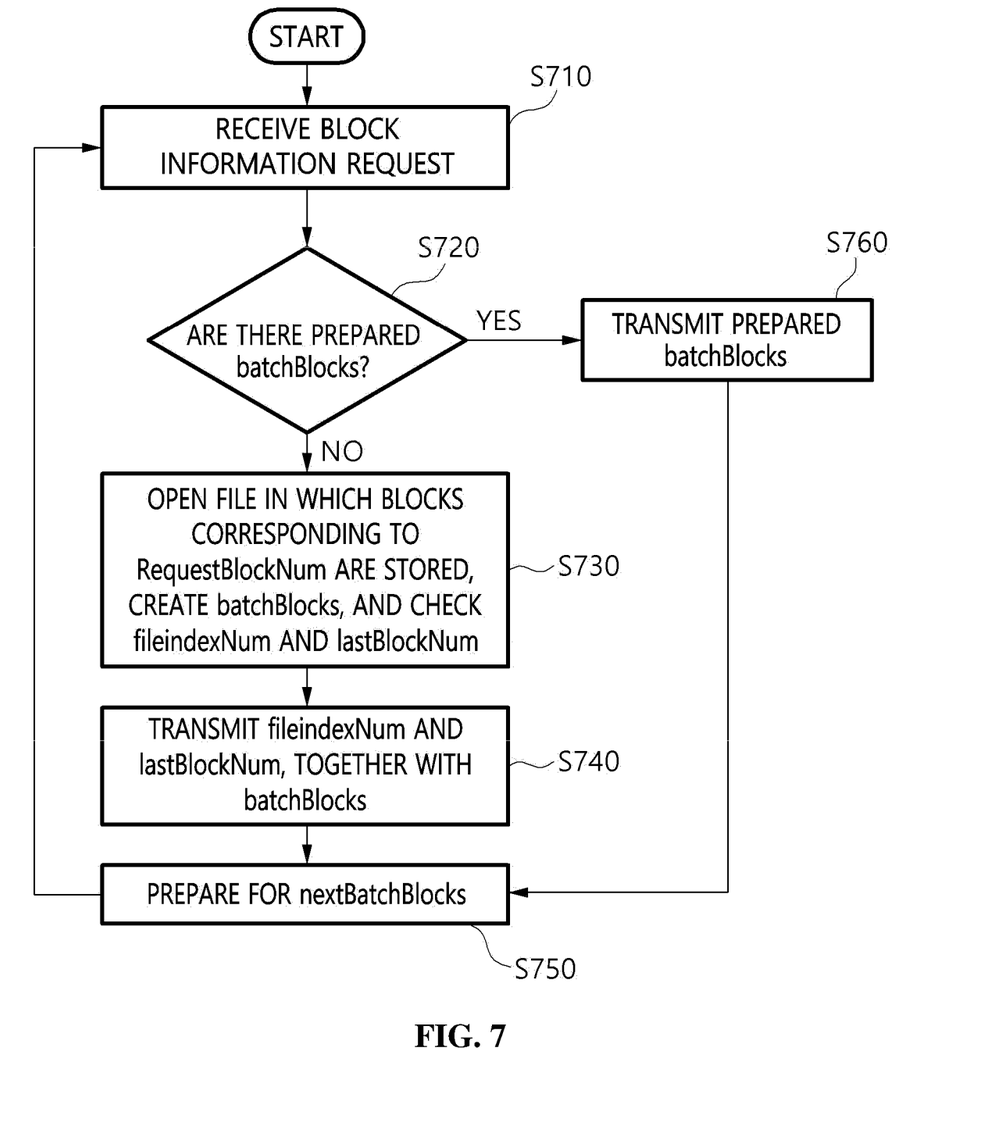
FIG. 7 is a flowchart for explaining a high-speed synchronization method based on a blockchain unit file in the existing peer node of a blockchain framework according to an embodiment.

FIG. 7 is a flowchart for explaining a high-speed synchronization method based on a blockchain unit file in the existing peer node of a blockchain framework according to an embodiment.

Referring to FIG. 7, the high-speed synchronization method based on a blockchain unit file according to the embodiment may include step S710 of receiving a request to deliver blocks corresponding to the size, obtained by adding a certain size to the peer block size (peerBlockHeight), from a participating peer node that newly accesses or re-accesses the blockchain framework and steps S720 to S760 of creating the requested blocks in the form of blocks having the certain size and transmitting the created blocks to the participating peer node 10.

In detail, at transmission steps S720 to S760, the existing peer node opens a unit file in which blocks corresponding to a number (RequestBlockNum), obtained by adding the certain size (batchSize: 10) to the peer block size (peerBlockHeight), are stored, and creates blocks having the certain size (batchBlocks) at step S730. That is, the existing peer node loads (gets) index information of an initial block so as to create the initial block, opens the unit file using the corresponding index information (fileIndexNum), reads required data, and then creates individual blocks. In this case, the number of the last block (lastBlockNum) among the blocks to be stored and managed is checked.

Thereafter, the existing peer node transmits the file index number (fileIndexNum) and the last block number (lastBlockNum), together with the created blocks having the certain size (batchBlocks), to the participating peer node 10 at step S740.

Here, the existing peer node may create, in advance, next blocks having the certain size (batchBlocks) in preparation for next consecutive requests received from the participating peer node 10, thus providing against the next consecutive requests, at step S750. Thereafter, the opened unit file may be closed.

Thereafter, as a block information request is received again from the participating peer node 10 at step S710, the existing peer node may transmit the prepared blocks having the certain size (batchBlocks) to the participating peer node 10 at step S760 when there are requested blocks having the certain size at step S720. As a result, a response time may be minimized.

That is, a peer node from which a request is accepted once may wait to receive next consecutive requests by creating blocks to be delivered in advance in preparation for the next consecutive requests, and a newly participating peer node sends consecutive requests to the peer node that has transmitted a response. The consecutive requests may be made based on the number of blocks stored in the file which keeps the blocks.

Figure 8:
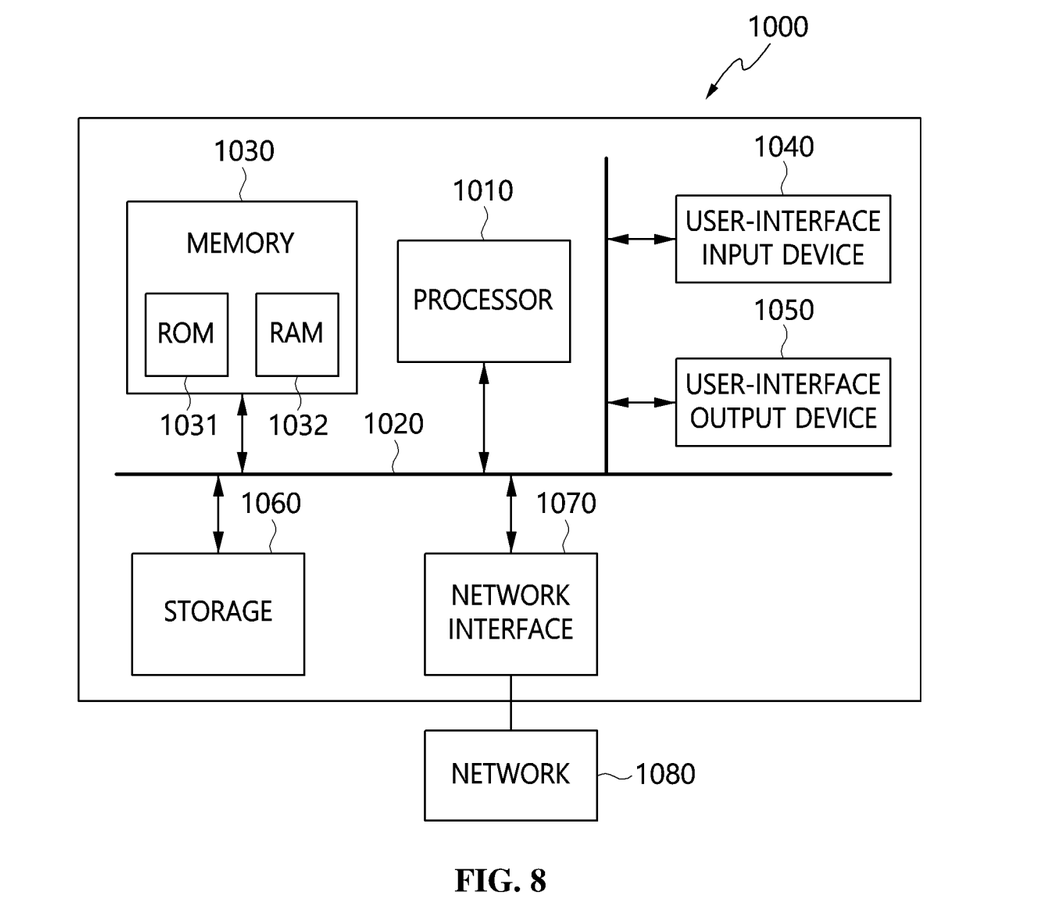
FIG. 8 is a diagram illustrating the configuration of a computer system according to an embodiment.

FIG. 8 is a diagram illustrating the configuration of a computer system according to an embodiment.

A high-speed synchronization apparatus based on a blockchain unit file according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

Also, the high-speed synchronization apparatus and method based on a blockchain unit file according to the embodiment may further include a database (DB) composed of unit files having a uniform size, in which blocks are to be sequentially stored.

The above-described program according to the embodiment may perform a high-speed synchronization method based on a blockchain unit file.

According to the foregoing embodiments, there are advantages in that, during a process of synchronization with existing ledgers (blocks) when a new peer node or a temporarily suspended peer node participates in a blockchain framework, the newly participating peer node may request and process blocks from multiple existing peer nodes in a parallel processing manner, and in that the existing peer nodes may create consecutive blocks in advance in a file opened once and rapidly deliver the created blocks at the next requests during a process of creating and delivering requested blocks, thus reducing the time required for synchronization between the blocks.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. A synchronization apparatus comprising:
a memory configured to store at least one program;
a database including blockchain unit files having a uniform size in which blocks of the blockchain unit files are to be sequentially stored such that when sizes of blocks to be stored are greater than a size of one blockchain unit file, the blocks are consecutively stored in a newly created blockchain unit file; and
a processor configured to execute the program, wherein the program is configured to perform:
when a peer block size is less than a channel block size, receiving blocks from a peer node that owns a block having the channel block size and synchronizing the received blocks, wherein:
the synchronizing comprises storing, in parallel, the received blocks and blocks simultaneously received from different peer nodes for respective blockchain unit files in the database,
the peer block size represents a size of a block owned by the peer node,
the channel block size represents a size of a block in use in a blockchain framework composed of the peer node and the different peer nodes, and
the peer node newly accesses or re-accesses the blockchain framework.

2. The synchronization apparatus of claim 1, wherein the program is further configured to perform:
creating multiple threads and performing the synchronizing in each of the multiple threads.

3. The synchronization apparatus of claim 1, wherein the program is further configured to perform:
receiving and storing blocks stored in one blockchain unit file from the peer node that owns the block having the channel block size.

4. The synchronization apparatus of claim 3, wherein
an unused peer node is a peer node that is not used in the synchronizing from among peer nodes included in a list of all peer nodes that own the block having the channel block size.

5. The synchronization apparatus of claim 4, wherein the program is further configured to perform:
opening a blockchain unit file.

6. The synchronization apparatus of claim 3, wherein the program is further configured to perform:
in the storing, requesting blocks from the peer node corresponding to a size, wherein the size is based on a certain size and the peer block size;
receiving a file index number and a last block number together with the requested blocks from the peer node; and
storing the received blocks in a blockchain unit file corresponding to the received file index number, wherein a process from the requesting to the storing is repeatedly performed until the peer block size becomes equal to or greater than the last block number.

7. The synchronization apparatus of claim 6, wherein:
in the requesting, a state of the peer node is an in-use state; and
when the peer block size becomes equal to or greater than the last block number, the state of the peer node is an unused state.

8. The synchronization apparatus of claim 6, wherein when requested blocks are initially received from the peer node, the peer block size is greater than the last block number.

9. A synchronization apparatus comprising:
a memory configured to store at least one program;
a database including blockchain unit files having a uniform size in which blocks of the blockchain unit files are to be sequentially stored such that when sizes of blocks to be stored are greater than a size of one blockchain unit file, the blocks are consecutively stored in a newly created blockchain unit file; and
a processor configured to execute the program, wherein the program is configured to perform:
receiving a request for blocks corresponding to a size from a peer node, wherein the size is based on a certain size and a peer block size from the peer node that newly accesses or re-accesses a blockchain framework composed of the peer node and different peer nodes;
creating the requested blocks having the size; and
transmitting the created blocks to the peer node, wherein:
when the peer block size is less than a channel block size, receiving blocks from the peer node that owns a block having the channel block size and synchronizing the received blocks, wherein:
the synchronizing comprises storing, in parallel, the received blocks and blocks simultaneously received from the different peer nodes for respective blockchain unit files in the database,
the peer block size represents a size of a block owned by the peer node, and
the channel block size represents a size of a block in use in the blockchain framework.

10. The synchronization apparatus of claim 9, wherein the program is further configured to perform:
in the transmitting, opening a blockchain unit file in which the blocks corresponding to the size are stored;
creating the blocks having the size in the blockchain unit file; and
transmitting a file index number and a last block number together with the created blocks to the peer node.

11. The synchronization apparatus of claim 10, wherein the program is further configured to perform:
creating next blocks having the size in preparation for subsequent requests from the peer node.

12. The synchronization apparatus of claim 11, wherein the program is further configured to perform:
in the transmitting, when there are requested blocks having the size, transmitting prepared blocks having the size.

13. A synchronization method performed in a peer node that newly accesses or re-accesses a blockchain framework composed of the peer node and different peer nodes, each peer node including a database including blockchain unit files having a uniform size in which blocks are to be sequentially stored such that when sizes of blocks to be stored are greater than a size of one blockchain unit file, the blocks are consecutively stored in a newly created blockchain unit file, the synchronization method comprising:
when a peer block size is less than a channel block size, receiving blocks from a peer node that owns a block having the channel block size and synchronizing the received blocks, wherein;
the synchronizing comprises storing, in parallel, the received blocks and blocks simultaneously received from different peer nodes for respective blockchain unit files in the database,
the peer block size represents a size of a block owned by the peer node, and
the channel block size represents a size of a block in use in the blockchain framework.

14. The synchronization method of claim 13, further comprising:
creating multiple threads, wherein the synchronizing is performed in each of the multiple threads.

15. The synchronization method of claim 13, wherein the synchronizing further comprises:
receiving and storing blocks stored in one blockchain unit file from the peer node that owns the block having the channel block size.

16. The synchronization method of claim 15, wherein an unused peer node is a peer node that is not used in the synchronizing from among the peer nodes included in a list of all peer nodes that own the block having the channel block size.

17. The synchronization method of claim 16, further comprising:
opening a blockchain unit file.

18. The synchronization method of claim 15, wherein the storing further comprises:
requesting blocks from the peer node corresponding to a size, wherein the size is based on a certain size and the peer block size;
receiving a file index number and a last block number together with requested blocks from the peer node; and
storing the received blocks in a blockchain unit file corresponding to the received file index number, wherein a process from the requesting to the storing is repeatedly performed until the peer block size becomes equal to or greater than the last block number.

19. The synchronization method of claim 18, wherein:
in the requesting, a state of the peer node is an in-use state, and when the peer block size becomes equal to or greater than the last block number, the state of the peer node is an unused state.

20. The synchronization method of claim 18, further comprising:
when requested blocks are initially received from the peer node, the peer block size is greater than the last block number.

* * * * *